No. 892,453. PATENTED JULY 7, 1908.
C. G. ROLLENHAGEN.
EXCAVATOR.
APPLICATION FILED NOV. 30, 1907.
3 SHEETS—SHEET 3.
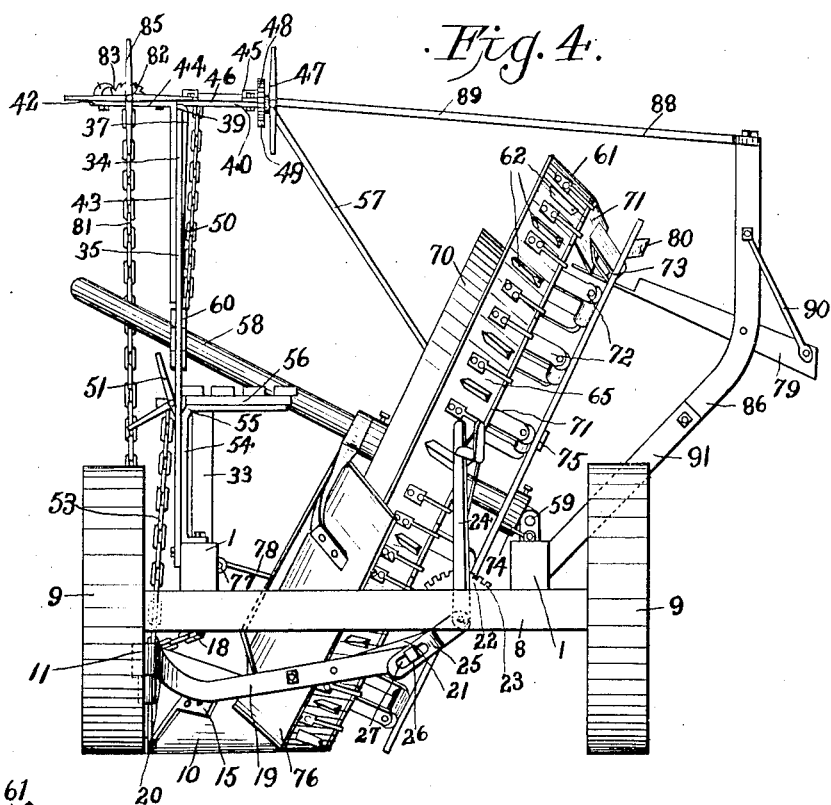
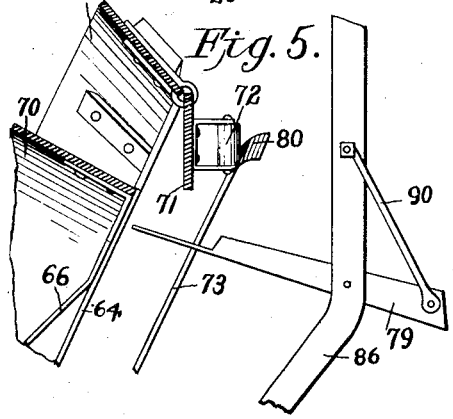
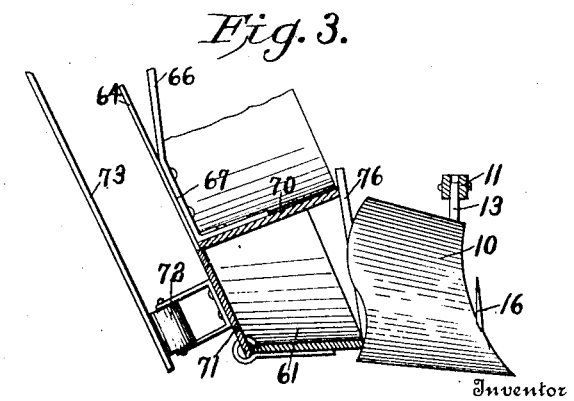
CARL G. ROLLENHAGEN,
Inventor
Witnesses
By John W. Farley
Attorney

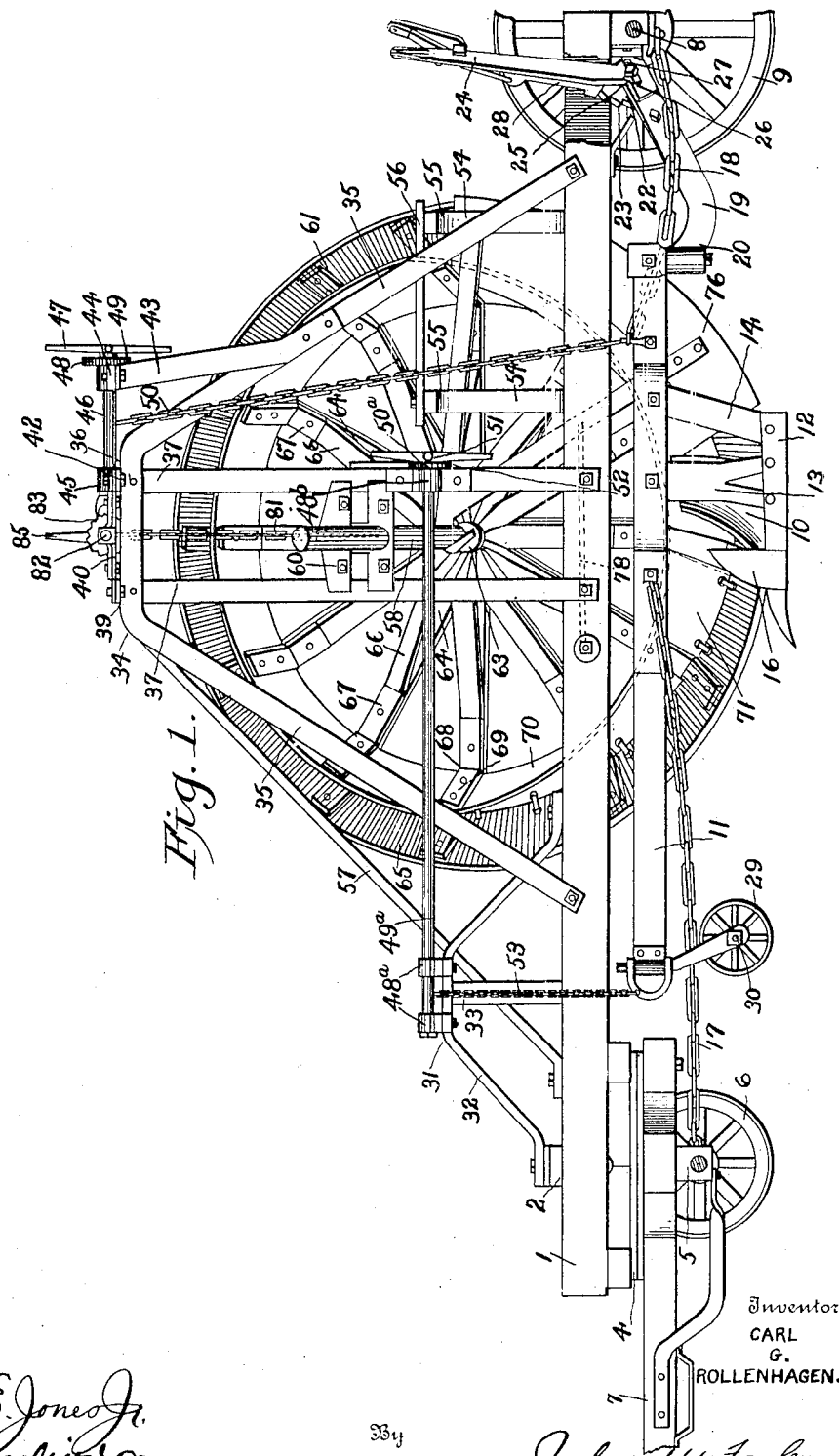

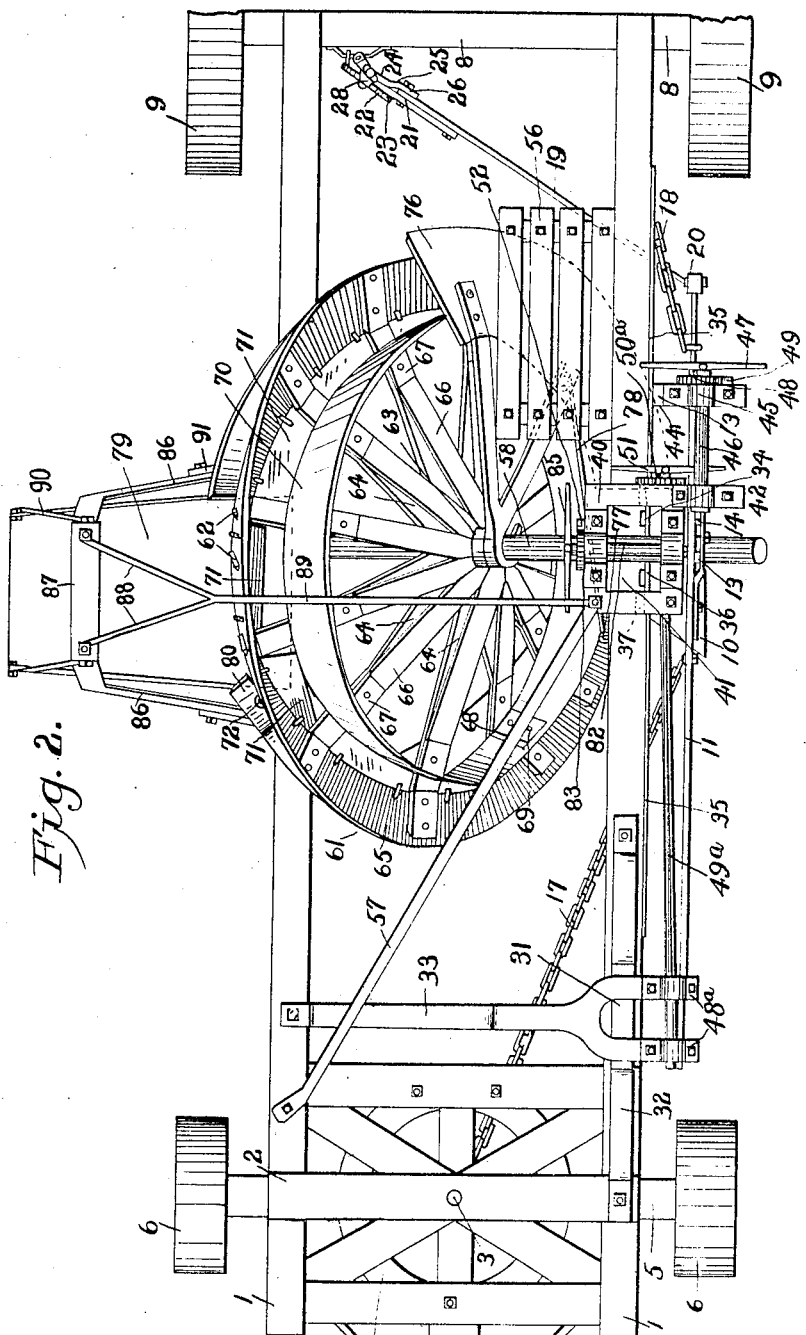

UNITED STATES PATENT OFFICE.

CARL GUSTAV ROLLENHAGEN, OF MEMPHIS, TENNESSEE, ASSIGNOR OF ONE-HALF TO P. H. ROGERS, OF MEMPHIS, TENNESSEE.

EXCAVATOR.

No. 892,453.  Specification of Letters Patent.  Patented July 7, 1908.

Application filed November 30, 1907. Serial No. 404,529.

*To all whom it may concern:*

Be it known that I, CARL GUSTAV ROLLENHAGEN, a citizen of the United States, residing at Memphis, in the county of Shelby and State of Tennessee, have invented certain new and useful Improvements in Excavators, of which the following is a specification.

My invention relates to excavating machines which are operated by draft means and at the same time possess means for plowing the earth and loading it into carts or other receptacles.

The object of the invention is to provide simple means of adjusting the plow and means for raising and lowering the dirt carrying wheel, to provide simple and efficient means for receiving and discharging the dirt, and generally to improve the construction of a device of this class.

To this end my invention is embodied in preferable form in the device hereinafter described and illustrated in the accompanying drawings.

In these drawings, Figure 1 is a side view in elevation; Fig. 2 is a top plan view; Fig. 3 is a section of the wheel near the plow showing the door in closed position and ready to receive the plowed earth; Fig. 4 is a rear view in elevation and Fig. 5 is a section of the wheel near the chute showing the door in open position to discharge the earth.

Referring to the drawings, the framework upon which the machine is mounted consists of longitudinal bars 1 which are connected to each other by means of a cross-bar 2 at its front end. A king bolt 3 extends through the cross-bar 2 and carries a fifth-wheel 4, to which is secured the front axle 5 which carries wheels 6. A tongue 7 is connected to the front axle. At the rear end of the device the longitudinal bars are connected to a rear axle 8 which carries wheels 9.

A plow 10 is secured to a longitudinal plow-beam 11 by means of a brace 12 to which is secured upright braces 13 and 14. To brace 13 is secured another brace 15 which is connected to the back of the plow so as to strengthen the same while it is plowing. The plow also has a vertical tooth 16 to evenly cut the side of the part of the earth through which the plow is drawn. A chain 17 is connected to the plow-beam and to the front axle so that the plow will always cut in the direction in which the excavator is drawn. Another chain 18 is connected to the plow-beam and to the rear axle. At the rear end of the plow-beam a bar 19 pivoted at 20, is attached. To this bar is attached a pivoted bar 21 which carries a plate 22 provided with ratchet teeth 23. A lever 24 is bent at 25 to form a horizontal portion 26 which is pivoted to the bar 21. The horizontal portion of the lever has a long slot 27 at its pivot to allow free movement of the working parts. To this lever is secured a spring operated pawl 28. The object of this pawl and ratchet attachment is to regulate the depth of cut of the plow. At the front end of the plow-beam is a roller 29 mounted on an axle 30 which is adapted to bear on the ground to make the running of the plow easier.

Near the front end of the machine is an elevated framework 31 composed of arms 32 and 33 secured to the longitudinal bars. Another framework 34 consisting of slanting portions 35 and a top portion 36 is secured to one of the longitudinal bars on the side of the machine. Extending upwardly at right angles to the said longitudinal bar are uprights 37, bent at 39, to extend over and beyond the top portion of the slanting arms 35. A plate 40, cut away at 41 and having an extension 42, is secured to this framework. A vertical bar 43 extends from one of the slanting portions 35 of the framework and is bent to form a flat portion 44. Secured to this flat portion and to the extension 42 of the plates are bearings 45 in which revolves a shaft 46 having a hand-wheel 47. The shaft carries a ratchet plate 48 which coöperates with a pawl 49. A chain 50 connected to the plow-beam extends from the shaft 46 and is adapted to raise the rear end of the plow from the ground when the same is to be brought out of operation.

Bearings 48$^a$ and 48$^b$ are secured to the frame-work 31 and to one of the uprights 37, respectively. In these bearings is mounted a shaft 49$^a$ carrying ratchet teeth 50$^a$ and having a hand-wheel 51. A pawl 52 to engage the ratchet teeth 50$^a$ is pivoted on the frame. The shaft is adapted to be turned by the hand-wheel to bring the front end of the plow out of contact with the ground, by means of a chain 53 connected to the front end of the plow and to the above mentioned shaft. The same arrangement of pawl and ratchet is shown more plainly in Fig. 4, with respect to means for raising and lowering the rear end of the plow-beam, and hereinafter described.

Braces 54 bent at 55, are secured to the longitudinal bar, on which is mounted a platform 56 which is used by the workmen in operating the various parts of the machine.

To the plate 40 is secured a brace 57 which extends diagonally across the machine and is connected to one of the longitudinal bars.

An inclined axle 58 is pivotally mounted at 59 and extends across the machine and through a guide-plate 60 which slides on the uprights 37. On this inclined axle is mounted a wheel 61 having traction teeth 62 by which contact with the ground is made. The wheel is situated adjacent to the plow and receives the earth turned up by the plow. The wheel has a hub 63 from which extends spokes 64 to join the slanted outer rim 65 of the wheel. Slanted spokes 66 branch from the hub and connect with the other spokes at 67 and are bent at 68 to form projections 69 to which are secured the inner rim 70 of the wheel. The dirt is carried in the space between the inner and outer rims. To the inner radial edge of the outer rim and on the outside thereof are hinged doors 71 forming the bottom of the dirt-receiving portion of the elevator wheel. These doors or pivoted bottom plates are inclined to the outer rim and extend radially of the wheel and are adapted to swing outwardly and are provided with loosely mounted rollers 72 on their outer faces which bear on a stationary track 73 rigidly connected to the axle and to a stop 74. The track has braces 75.

To prevent the dirt as it is carried upwardly by the wheel from falling out, a detachable guard plate 76 is attached to the wheel axle and to a hook 77 by means of a bar 78 placed behind the plow.

The track 73 is broken away a short distance at the top and the wheel due to its inclination causes the doors by their weight to open and the dirt to fall into a discharge chute 79, which may lead to a wagon drawn beside the excavator. After the doors pass the chute they engage a flared portion 80 of the track which permits them to engage the track readily and the track then holds the doors closed until they again reach the chute.

To bring the wheel out of engagement with the ground a chain 81 secured to a bar 82 operated by a pawl and ratchet attachment 83 mounted on a shaft 84 is placed on the plate 40. The shaft 84 has a hand-wheel 85.

The chute is secured to bent rods 86 joined at the top by a bar 87 to which is connected fingers 88 of a brace 89 secured to the plate 40 and the chute is further strengthened by braces 90 and 91.

The operation is as follows: The device is drawn along by horse or other power. The plow throws the dirt into the dirt-carrying wheel which revolves and lifts and empties the dirt into the chute by means of the hinged doors. The rollers of the doors are released when they reach the chute to allow the doors to swing outwardly and the dirt to escape. The dirt from the chute is emptied into carts or other receptacles to be disposed of as the occasion requires.

To elevate the plow from working position, the chains 50 and 53 are wound up on their respective shafts $49^a$ and 46, by means of the hand-wheels, and to lift the dirt elevating and discharging wheel from contact with the ground, the chain 81 is raised by turning its shaft 82. When the elevating and discharging wheel and the plow have thus been elevated from the ground, the device can be drawn along like an ordinary wagon.

It is clear that various changes in the details of the device may be made without departing from the principle of my invention.

Having thus described my invention, what I claim is:—

1. A wheeled excavator having a frame, an inclined axle mounted on said frame, a dirt-receiving wheel adapted to turn on said axle, a hub on said wheel, said wheel having an inner and outer rim connected to the hub of the wheel by spokes, hinged doors connected to the outer rim and adapted to open by their weight to allow the dirt to escape, substantially as described.

2. A wheeled excavator having a frame, a platform for workmen mounted on said frame, an inclined axle on said frame pivoted at one end and adapted to move in a plate at its other end, a dirt elevating and discharge wheel mounted on said axle, said wheel having a space adapted to receive dirt formed by rims and hinged doors, a guard-plate secured to the inclined axle and to the frame, substantially as described.

3. A wheeled excavator having a frame and an inclined axle mounted thereon, a dirt elevating and discharging wheel having outer and inner rims adapted to turn thereon, hinged doors pivoted to said outer rim, said hinged doors having rollers thereon adapted to travel on a track back of said dirt elevating and discharging wheel, said track rigidly secured to the inclined axle and to the frame of the machine, said track also having ends, one of said ends causing the doors to fall radially and outwardly by their weight, a flared portion at the other end of the track which leads the rollers of the doors to the track, substantially as described.

4. A wheeled excavator having an inclined wheel situated adjacent to the plow and adapted to revolve on an inclined axle, teeth mounted on said wheel, a hub on said wheel, spokes branching from said hub to secure an outer rim to the wheel, other spokes branching from said hub and securing an inner rim to the wheel whereby a dirt receiving space is formed between the two rims, substantially as described.

5. A wheeled excavator having a frame, an inclined axle mounted on said frame, a dirt elevating and discharging wheel mounted on said axle, said wheel having an outer rim, hinged doors adapted to swing radially and outwardly pivoted to said outer rim, said hinged doors having rollers, said rollers adapted to travel on a stationary track, said track having ends, said rollers adapted to disengage the track at one of said ends, said hinged doors adapted to swing radially and outwardly by said disengagement of the rollers, and a dirt chute mounted on the frame of the excavator, substantially as described.

6. A wheeled excavator having a plow, a plow-beam connected thereto, a pivoted bar at one end of the plow-beam carrying a ratchet-plate, a lever connected to said pivoted bar, and a pawl attachment secured to said lever to coöperate with the ratchet-plate to regulate the depth of cut of the plow, substantially as described.

7. A wheeled excavator having a frame, a plow, a plow-beam connected thereto, a roller at one end of said plow-beam, means to connect said plow-beam to the rear axle and to the front axle, a series of frames mounted on the machine, pawl and ratchet attachments connected to said frame one at each end to elevate or lower said plow and plow-beam from and into contact with the ground, substantially as described.

8. A wheeled excavator having a main frame, an inclined axle pivotally mounted thereon, a wheel on said axle, a vertical frame on said main frame, a sliding plate through which one end of said inclined axle is projected, said plate adapted to move on uprights in said frame, a chain connected to said inclined axle and a pawl and ratchet attachment mounted on the frame to elevate or lower the wheel, substantially as described.

In testimony whereof I have affixed my signature, in presence of two witnesses.

CARL GUSTAV ROLLENHAGEN.

Witnesses:
    CHAS. R. SHANNON,
    R. H. JONES.